United States Patent [19]

Kennett

[11] Patent Number: 5,423,411
[45] Date of Patent: Jun. 13, 1995

[54] CLEANING APPARATUS AND CLEANING METHOD

[75] Inventor: Charles J. Kennett, Howwood, United Kingdom

[73] Assignee: Teknek Electronics Limited, Bridge of Weir, United Kingdom

[21] Appl. No.: 53,709

[22] Filed: Apr. 30, 1993

[30] Foreign Application Priority Data

May 1, 1992 [GB] United Kingdom ............... 9209466

[51] Int. Cl.⁶ ............................................. B65G 45/10
[52] U.S. Cl. .................................. 198/494; 15/256.51
[58] Field of Search ................... 198/493, 494, 498; 15/256.5, 256.51, 256.53

[56] References Cited

U.S. PATENT DOCUMENTS

| | | | |
|---|---|---|---|
| 2,018,719 | 10/1935 | Haug | 198/494 |
| 4,843,436 | 6/1989 | Evangelista et al. | 15/256.51 X |
| 5,069,128 | 12/1991 | Hara et al. | 15/256.51 X |
| 5,138,390 | 8/1992 | Miyabayashi et al. | 15/256.51 X |
| 5,153,964 | 10/1992 | Gelardi et al. | 15/256.51 X |
| 5,198,243 | 3/1993 | Shimizu et al. | 15/256.51 X |

FOREIGN PATENT DOCUMENTS

| | | |
|---|---|---|
| 2711395A1 | 9/1978 | Germany . |
| 1152491 | 5/1969 | United Kingdom . |
| 1457541 | 12/1976 | United Kingdom . |
| 1570118 | 6/1980 | United Kingdom . |

*Primary Examiner*—James R. Bidwell
*Attorney, Agent, or Firm*—Popham, Haik, Schnobrich & Kaufman, Ltd.

[57] ABSTRACT

Apparatus and method for cleaning conveyor systems, particularly for removing dust and other contaminants from optical processing equipment. A rigid or flexible sheet is coated on one or both faces with a tacky elastomer which is preferably a silicone. The sheet is moved over or through the conveyor system in place of a conveyed article, so that contaminants adhere to the elastomer and are ultimately removed from the conveyor along with the cleaning sheet. The invention is particularly applicable to cleaning conveyors transporting photographs and photo-tools, and to cleaning reprographic equipment incorporating paper transport rollers, eg photocopiers, facsimile machines, and desk-top printers.

15 Claims, 2 Drawing Sheets

CLEANING APPARATUS AND CLEANING METHOD

BACKGROUND OF THE INVENTION

This invention relates to a cleaning apparatus and a cleaning method for cleaning conveying elements of conveyor systems, and more particularly but not exclusively relates to the cleaning of conveyor rollers.

This invention has particular application to the cleaning of the rollers of a roller conveyor system in order to remove dust or other contaminants from the conveyor rollers which otherwise would be transferred on to articles or materials being conveyed by the rollers. When transporting items such as photographs or photo-tools along a roller conveyor, it is essential that contaminants from the conveyor rollers are not transferred on to the roller-contacted surfaces of the photographs or photo-tools, thereby to prevent the contaminants adversely affecting the optical properties of the items which would otherwise result in defective and products. A known procedure for cleaning conveyor rollers comprises manually wiping the rollers with a cloth, but this procedure necessitates gaining adequate access to the rollers, which may require, for example, that equipment incorporating the rollers be at least partially dismantled. At the very least, prior art conveyor cleaning procedures extensively disrupt normal productive operations.

It is therefore an object of the present invention to provide a cleaning apparatus and a cleaning method for cleaning conveying elements of conveyor systems which obviates or mitigates the disadvantages of the prior art.

BRIEF SUMMARY OF THE INVENTION

According to a first aspect of the present invention there is provided a cleaning apparatus for cleaning at least a selected part of a conveyor system, said conveyor system comprising at least one conveying element, said at least one conveying element comprising at least one conveying surface contactable with a conveyed entity in use of said conveyor system to convey said conveyed entity in a conveying direction of said conveyor system, said at least one conveying surface constituting said selected part of said conveyor system, said cleaning apparatus comprising at least one cleaning element having mutually opposed major faces, said cleaning apparatus being characterised in that at least one of said major faces is surfaced with a tacky substance to provide said at least one cleaning element with at least one tacky-surfaced major face, said at least one cleaning element being temporarily contactable with said at least one conveying element to bring said at least one tacky-surfaced major face of said at least one cleaning element into temporary contact with said at least one conveying surface of said at least one conveying element during use of said cleaning apparatus to cause any contaminants present on said at least one conveying surface to adhere to said tacky substance of said at least one tacky-surfaced major face of said at least one cleaning element and to cause any so-adhered contaminants to be removed with said at least one cleaning element at the cessation of said temporary contact of said at least one cleaning element with said at least one conveying element whereby to clean at least said selected part of said conveyor system.

Said tacky substance is preferably an elastomer, said elastomer preferably being a silicone, said silicone preferably being a high temperature vulcanising type of silicone, for example as sold by GEC plc (UK).

Said conveyor system may be a conveyor system in which said at least one conveying surface thereof has a longitudinal dimension measured in said conveying direction, said cleaning apparatus being characterised in that said at least one tacky-surfaced major face has a longitudinal dimension not less than said longitudinal dimension of said at least one conveying surface.

Said conveyor system may be a roller conveyor system in which said at least one conveying element is an entity-conveying roller having a peripheral surface constituting said at least one conveying surface, said peripheral surface of said roller having a circumferential dimension, said cleaning apparatus being further characterised in that said longitudinal dimension of said at least one cleaning element is greater than said circumferential dimension. Said roller conveyor system would normally comprise a plurality of such rollers disposed to be sequentially contacted by an entity conveyed by said conveyor system. Said plurality of rollers may be arranged in a single row, for example to support the weight of a conveyed entity contacting said rollers under the influence of gravity, or said rollers may be arranged in two mutually generally parallel rows to pinch a conveyed entity therebetween.

Said conveyor system may alternatively be a belt conveyor system in which at least one endless flexible belt is mounted on a plurality of rollers, said at least one belt having an outer belt surface opposed to an inner belt surface contacting said plurality of rollers, said outer belt surface constituting said at least one conveying surface, said outer belt surface having an overall length measured longitudinally of said belt, said cleaning apparatus being further characterised in that said longitudinal dimension of said at least one cleaning element is greater than said overall length of said outer belt surface.

Said conveyor system may be a conveyor system in which said at least one conveying surface has a transverse dimension measured transverse to said conveying direction, said at least one cleaning element of said cleaning apparatus may be rectangular in plan, said at least one cleaning element having a transverse dimension orthogonal to said longitudinal dimension of said at least one cleaning element, said transverse dimension of said at least one cleaning element preferably being less than said transverse dimension of said at least one conveying surface.

Said at least one cleaning element may be substantially entirely composed of said tacky substance. Alternatively, said at least one cleaning element may comprise a substrate which is coated on one or both major faces thereof with said tacky substance. Said at least one cleaning element may be formed to be substantially rigid, or, alternatively, said at least one cleaning element may be formed to be flexible.

According to a second aspect of the present invention there is provided a cleaning method for cleaning at least a selected part of a conveyor system, said conveyor system comprising at least one conveying element, said at least one conveying element comprising at least one conveying surface contactable with a conveyed entity in use of said conveyor system to convey said conveyed entity in a conveying direction of said conveyor system, said at least one conveying surface constituting said selected part of said conveyor system, said method being characterised by the steps of providing a cleaning apparatus according to the first aspect of the present invention, temporarily contacting said at least one tacky-surfaced major face of said at least one cleaning element of said cleaning apparatus with said at least one conveying surface of said conveyor system in a manner to cause said at least one tacky-surfaced major face to progress in said conveying direction along substantially the full length of said at least one conveying surface and to cause any contaminants present on said at least one conveying surface to adhere to said tacky substance of said at least one tacky-surfaced major face of said at least one cleaning element, and finally withdrawing said at least one cleaning element from said temporary contact with said at least one conveying element to cause any so-adhered contaminants to be removed with said at least one cleaning element whereby to clean at least said selected part of said conveyor system.

BRIEF DESCRIPTION OF THE DRAWINGS

Embodiments of the present invention will now be described by way of example, with reference to the accompanying drawings wherein.

DETAILED DESCRIPTION OF THE PREFERRED EMBODIMENTS OF THE INVENTION

Figure 1:
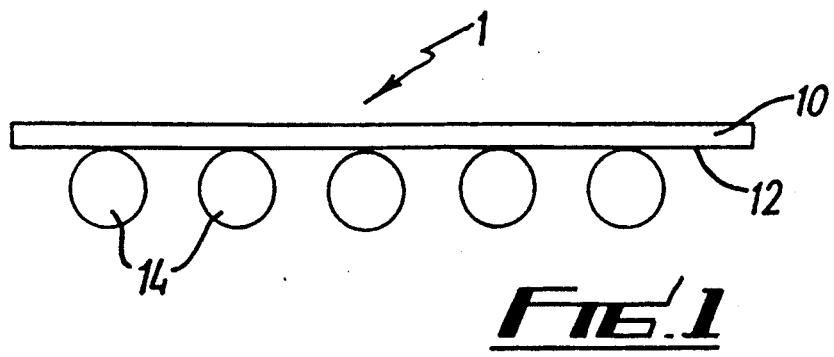
FIG. 1 is a side view of a first embodiment of a conveyor system cleaning apparatus in accordance with the present invention, the first embodiment of the cleaning apparatus being shown located on the rollers of a single-row roller conveyor system.

Referring first to FIG. 1, there is shown a first embodiment of a cleaning apparatus 1 for use in cleaning the rollers 14 of a conveyor system. The cleaning apparatus 1 comprises a cleaning element 10 in the form of a rectangular sheet having a silicone-coated surface 12 arranged to be in contact with the rollers 14 of the conveyor system. The rectangular sheet 10 is rigid and is of greater length than the circumference of at least one roller 14 such that as the rectangular sheet 10 passes over the surface of each roller 14, the entire surface of each roller 14 comes into contact with the silicone-coated surface 12 of the rectangular sheet 10.

Figure 2:
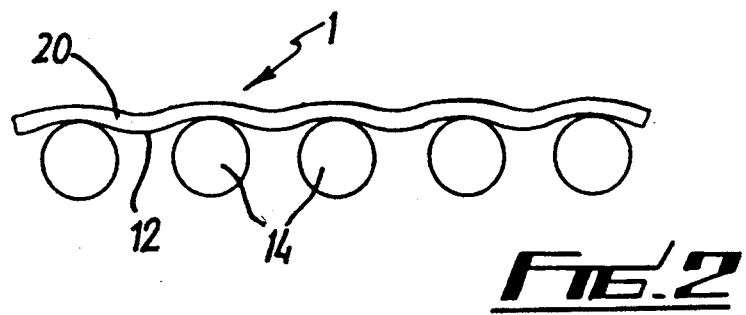
FIG. 2 is a side view of a second embodiment of a conveyor system cleaning apparatus in accordance with the present invention, the second embodiment of the cleaning apparatus being shown located on the rollers of a single-row roller conveyor system.

A second embodiment of the cleaning apparatus 1 is shown in FIG. 2. In this second embodiment, the rigid rectangular sheet 10 of FIG. 1 is replaced with a flexible rectangular sheet 20. The flexible rectangular sheet 20 also has a silicone-coated surface 12 in contact with the rollers 14. The flexible nature of the rectangular sheet 20 allows a greater area of contact of the silicone coated surface 12 over the surface of the rollers 14.

Figure 3:
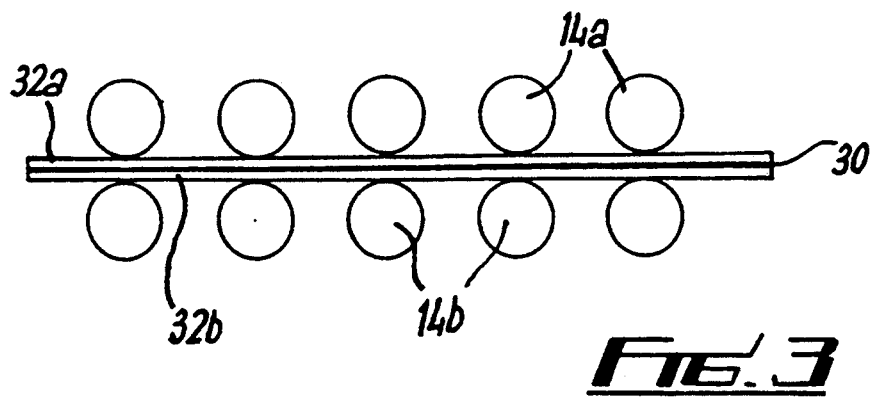
FIG. 3 is a side view of a third embodiment of a conveyor system cleaning apparatus in accordance with the present invention, the third embodiment of the cleaning apparatus being shown located between the rollers of a double-row roller conveyor system.

A third embodiment of the cleaning apparatus 1 is shown in FIG. 3. In this third embodiment the cleaning apparatus 1 comprises a cleaning element in the form of a rectangular sheet 30 having silicone-coated surfaces 32a and 32b on both sides of the rectangular sheet 30. This provides for opposed sets of rollers 14a, 14b of a conveyor system to be cleaned simultaneously using only one rectangular sheet 30.

Figure 4:
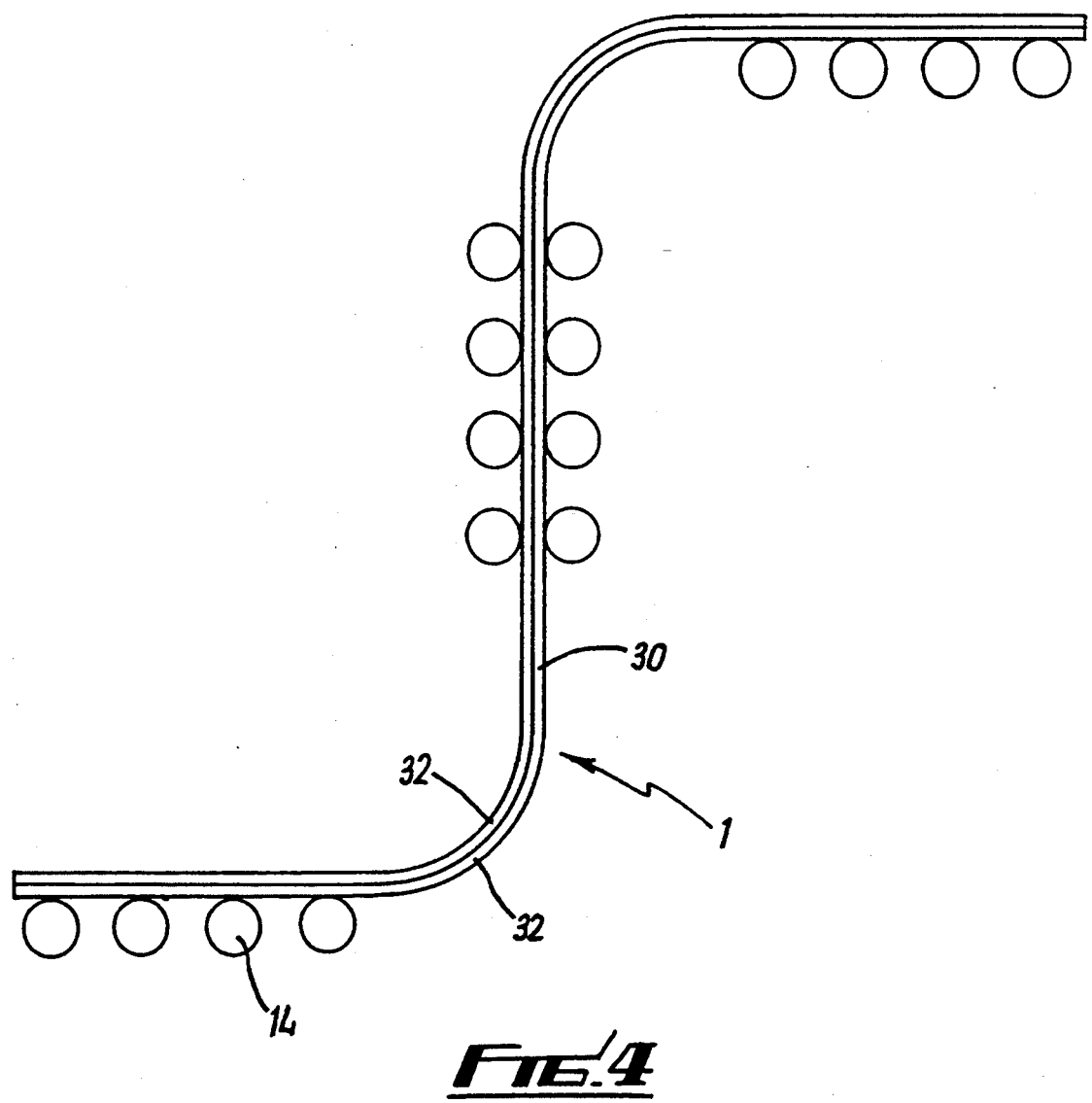
FIG. 4 is a side view of the third embodiment in operation in an extended roller conveyor system.

FIG. 4 shows the cleaning apparatus 1 of FIG. 3 in operation in an extended roller conveyor system. The rectangular sheet 30 is placed on the rollers 14 which are to be cleaned so as to put one of the silicone-coated surfaces 32 of the sheet 30 in contact with the peripheral surfaces of the rollers 14. The roller conveyor system is then put into operation such that rotation of the rollers 14 moves the rectangular sheet 30 in the normal conveying direction. As the rectangular sheet 30 moves along the rollers 14 any dirt, dust or other contaminants on the rollers 14 is picked up by the silicone-coated surface 32 of the rectangular sheet 30. This is due to the tackiness of the silicone which picks up all loose materials on the surfaces of the rollers 14. As the rectangular sheet 30 passes between the opposed sets of rollers 14 the silicone coated surfaces 32 located on both sides of the rectangular sheet 30 removes the dirt, dust and other contaminants from each set of the rollers 14 as described above.

Once the rollers 14 have been cleaned the rectangular sheet 30 may be discarded or alternatively removed and cleaned for subsequent re-use. Instead of being rectangular, the cleaning apparatus may alternatively be in the form of a long continuous strip suitable for the entire length of a conveyor system or alternatively a number of shorter rectangular sheets may be used to clean the rollers 14. In each case, the cleaning element of the cleaning apparatus is of a length greater than the circumference of a roller 14.

The present invention provides a conveyor system cleaning apparatus and a conveyor system cleaning method for removing contaminants from rollers or other conveying elements (eg an endless belt) of a conveyor system in a simple and efficient manner. The cleaning apparatus and method greatly reduce the risk of contamination of articles being conveyed along the conveyor system and obviate the need for manual cleaning of the rollers 14 (for example, by wiping the rollers with a cloth).

The cleaning element of the cleaning apparatus of the present invention may be constructed in its rigid form as a rigid substrate of plastics, metal, or any other suitable material, the substrate being coated on one or both of its major faces (according to whether the cleaning element is to be single-sided or double-sided) with a tacky elastomeric substance which is preferably a silicone. Where the cleaning element is to be flexible, it may be constructed as above but with a flexible substrate, or alternatively the cleaning element may be formed entirely from the tacky elastomeric substance.

The invention is particularly applicable to the cleaning of conveyor systems conveying articles whose finished optical quality is paramount. For example, such articles may comprise film negatives and photographs undergoing development and printing, printed circuit boards undergoing photolithographic fabrication, and reprographic equipment including paper transport systems, such as photocopiers, facsimile ("fax") machines, laser printers, and the like. In the latter cases, the sheet-like cleaning element is conveniently made to be the same size as a standard sheet of paper (eg, A4 or foolscap, etc) and is merely substituted at suitable intervals (eg daily or weekly) for a sheet of paper in a dummy (non-printing) cycle of the machine without having to open up the machine for access to the paper transport system as would be required with prior-art manual cleaning procedures. While certain modifications and variations have been described above, the invention is not restricted thereto, and other modifications and variations can be adopted without departing from the scope of the invention as defined in the appended claims.

I claim:

1. A cleaning apparatus for cleaning at least a selected part of a conveyor system, said conveyor system comprising at least one conveying element, said at least one conveying element comprising at least one conveying surface contactable with a conveyed entity in use of said conveyor system to convey said conveyed entity in a conveying direction of said conveyor system, said at least one conveying surface constituting said selected part of said conveyor system, said cleaning apparatus comprising at least one cleaning element having mutually opposed major faces, at least one of said major faces being surfaced with a tacky substance to provide said at least one cleaning element with at least one tacky-surfaced major face, said tacky substance being an elastomer, said elastomer being a silicon, said at least one cleaning element being temporarily contactable with said at least one conveying element to bring said at least one tacky-surfaced major face of said at least one cleaning element into temporary contact with said at least one conveying surface of said at least one conveying element during use of said cleaning apparatus to cause any contaminants present on said at least one conveying surface to a adhere to said tacky substance of said at least one tacky-surface major face of said at least one cleaning element and to cause any so-adhered contaminants to be removed with said at least one cleaning element at the cessation of said temporary contact of said at least one cleaning element with said at least one conveying element whereby to clean at least said selected part of said conveyor system.

2. Cleaning apparatus as claimed in claim 1, wherein said silicone is a high temperature vulcanising type of silicone.

3. Cleaning apparatus as clained in claim 1, wherein said conveyor system is a conveyor system in which said at least one conveying surface thereof has a longitudinal dimension measured in said conveying direction, said at least one tacky-surfaced major face of said at least one cleaning element of said cleaning apparatus having a longitudinal dimension not less than said longitudinal dimension of said at least one conveying surface.

4. Cleaning apparatus as claimed in claim 3, wherein said conveyor system is a roller conveyor system in which said at least one conveying element is an entity-conveying roller having a peripheral surface constituting said at least one conveying surface, said peripheral surface of said roller having a circumferential dimension, said longitudinal dimension of said at least one cleaning element of said cleaning apparatus being greater than said circumferential dimension.

5. Cleaning apparatus as claimed in claim 1, wherein said conveyor system is a conveyor system in which said at least one conveying surface thereof has a transverse dimension measured transverse to said conveying direction, said at least one cleaning element of said cleaning apparatus is rectangular in plan, said at least one cleaning element having a transverse dimension orthogonal to said longitudinal dimension of said at least one cleaning element, said transverse dimension of said at least one cleaning element being less than said transverse dimension of said at least one conveying surface.

6. Cleaning apparatus as claimed in claim 1, wherein said at least one cleaning element is substantially entirely composed of said tacky substance.

7. Cleaning apparatus as clained in claim 1, wherein said at least one cleaning element comprises a substrate which is coated on at least one major face thereof with said tacky substance.

8. Cleaning apparatus as claimed in claim 7, wherein said substrate is coated on both major faces thereof with said tacky substance.

9. Cleaning apparatus as claimed in claim 1, wherein said at least one cleaning element is formed to be substantially rigid.

10. Cleaning apparatus as claimed in claim 1, wherein said at least one cleaning element is formed to be flexible.

11. A cleaning method for cleaning at least a selected part of a conveyor system, said conveyor system comprising at least one conveying element, said at least one conveying element comprising at least one conveying surface contactable with a conveyed entity in use of said conveyor system to convey said conveyed entity in a conveying direction of said conveyor system, said at least one conveying surface constituting said selected part of said conveyor system, said method comprising the steps of providing a cleaning apparatus comprising at least one cleaning element having mutually opposed major faces, at least one of said major faces being surfaced with a tacky substance to provide said at least one cleaning element with at least one tacky-surfaced major face, said tacky substance being an elastomer, said elastomer being a silicone, temporarily contacting said at least one tacky-surfaced major face of said at least one cleaning element of said cleaning apparatus with said at least one conveying surface of said conveyor system in a manner to cause said at least one tacky-surfaced major face to progress in said conveying direction along substantially the full length of said at least one conveying surface and to cause any contaminants present on said at least one conveying surface to adhere to said tacky substance of said at least one tacky-surfaced major face of said at least one cleaning element, and finally withdrawing said at least one cleaning element from said temporary contact with said at least one conveying element to cause any so-adhered contaminants to be removed with said at least one cleaning element whereby to clean at least said selected part of said conveyer system.

12. Cleaning method as claimed in claim 11, wherein said silicone is a high temperature vulcanising type of silicone.

13. A conveyor system cleaning apparatus for cleaning at least a selected part of a conveyor system, said conveyor system comprising at least one conveying element, said at least one conveying element comprising at least one conveying surface contactable with a conveyed entity in use of said conveyor system to convey said conveyed entity in a conveying direction of said conveyor system, said at least one conveying surface having a longitudinal dimension measured in said conveying direction, said at least one conveying surface constituting said selected part of said conveyor system, said cleaning apparatus comprising at least one cleaning element having mutually opposed major faces, at least one of said major faces being surfaced with a tacky elastomeric silicone to provide said at least one cleaning element with at least one silicone-surfaced major face, said at least one silicone-surfaced major face having a longitudinal dimension not less than said longitudinal dimension of said at least one conveying system, said at least one cleaning element being temporarily contactable with said at least one conveying element to bring said at least one silicone-surfaced major face of said at least one cleaning element into temporary contact with said at least one conveying surface of said at least one conveying element during use of said cleaning apparatus to cause any contaminants present on said at least one conveying surface to adhere to said tacky elastomeric silicone of said at least one silicone-surfaced major face of said at least one cleaning element and to cause any so-adhered contaminants to be removed with said at least one cleaning element at the cessation of said temporary contact of said at least one cleaning element with said at least one conveying element whereby to clean at least said selected part of said conveyor system.

14. Conveyor system cleaning apparatus as claimed in claim 13, wherein said tacky elastomeric silicone is a high temperature vulcanising type of silicone.

15. Conveyor system cleaning apparatus as claimed in claim 13, wherein said conveyor system is a roller conveyor system in which said at least one conveying element is an entity-conveying roller having a peripheral surface constituting said at least one conveying surface, said peripheral surface of said roller having a circumferential dimension, said longitudinal dimension of said at least one cleaning element of said cleaning apparatus being greater than said circumferential dimension.

* * * * *